(12) United States Patent
Raynor (10) Patent No.: US 7,502,061 B2
(45) Date of Patent: Mar. 10, 2009

(54) METHOD FOR IMAGE SENSOR CALIBRATION AND ASSOCIATED DEVICES

(75) Inventor: Jeffrey Raynor, Edinburgh (GB)

(73) Assignee: STMicroelectronics Ltd., Marlow-Buckinghamshire (GB)

( * ) Notice: Subject to any disclaimer, the term of this patent is extended or adjusted under 35 U.S.C. 154(b) by 738 days.

(21) Appl. No.: 10/978,223

(22) Filed: Oct. 29, 2004

(65) Prior Publication Data

US 2005/0104983 A1 May 19, 2005

(30) Foreign Application Priority Data

Nov. 4, 2003 (EP) .................................. 03256970

(51) Int. Cl.
*H04N 3/14* (2006.01)
*H04N 5/335* (2006.01)

(52) U.S. Cl. ...................... 348/308; 348/241

(58) Field of Classification Search ................ 348/308, 348/241, 243, 245, 294; 327/51, 56, 77, 327/534; 250/208.1
See application file for complete search history.

(56) References Cited

U.S. PATENT DOCUMENTS

| | | | |
|---|---|---|---|
| 5,479,208 A | 12/1995 | Okumura | 348/301 |
| 5,877,715 A * | 3/1999 | Gowda et al. | 341/122 |
| 6,225,852 B1 * | 5/2001 | Cleveland et al. | 327/534 |
| 6,266,373 B1 * | 7/2001 | Bakhmutsky et al. | 375/240.17 |
| 6,366,317 B1 * | 4/2002 | Mattison et al. | 348/241 |
| 6,452,633 B1 * | 9/2002 | Merrill et al. | 348/302 |
| 6,538,695 B1 | 3/2003 | Xiao et al. | 348/245 |
| 6,583,817 B1 * | 6/2003 | Lee | 348/241 |

(Continued)

FOREIGN PATENT DOCUMENTS

| EP | 0675345 | 10/1995 |
|---|---|---|
| EP | 1081942 | 3/2001 |

OTHER PUBLICATIONS

Stuart Kleinfelder, SukHwan Lim, Xinqiao Liu, Abbas El Gamal, "A 10000 Frame/sec CMOS Digital Pixel Sensor," Fellow, IEEE, 2001.*
Eric Fossum, "CMOS Image Sensors Combat Noise," EE Times, Apr. 8, 2002.*

*Primary Examiner*—Tuan V Ho
*Assistant Examiner*—Dennis Hogue
(74) *Attorney, Agent, or Firm*—Lisa K. Jorgenson; Allen, Dyer, Doppelt, Milbrath & Gilchrist, P.A.

(57) ABSTRACT

An image sensor includes an array of digital pixels, a first frame store for storing reference data, and a second frame store for storing image data. The reference and image data are combine to cancel an off-set of the pixels in the array. A re-set and a calibration phase are performed while a shutter is closed to obtain reference data during a calibration phase. A comparator measures an off-set time to gather information on the off-set of the pixels. During or after an exposure phase a conversion time is measured representative of the illumination on the pixel. During the calibration phase the off-set is measured. This digital technique requires a much smaller voltage swing on the pixel, and known techniques and can be performed in a shorter time. This increases the overall frame rate of the image sensor since the time taken for the reset and calibration phases is less than the time taken for the exposure phase.

20 Claims, 6 Drawing Sheets

U.S. PATENT DOCUMENTS

| | | | |
|---|---|---|---|
| 6,590,611 B1 * | 7/2003 | Ishida et al. | 348/310 |
| 6,617,565 B2 * | 9/2003 | Wu | 250/208.1 |
| 6,704,050 B1 * | 3/2004 | Washkurak et al. | 348/294 |
| 6,727,486 B2 * | 4/2004 | Choi | 250/208.1 |
| 7,280,141 B1 * | 10/2007 | Frank et al. | 348/243 |
| 7,304,670 B1 * | 12/2007 | Hussey et al. | 348/241 |
| 2003/0015647 A1 * | 1/2003 | Guo et al. | 250/208.1 |
| 2006/0072025 A1 * | 4/2006 | Kakumoto et al. | 348/308 |
| 2006/0077273 A1 * | 4/2006 | Lee et al. | 348/308 |

* cited by examiner

METHOD FOR IMAGE SENSOR CALIBRATION AND ASSOCIATED DEVICES

FIELD OF THE INVENTION

The present invention relates to image sensors, and in particular, to a method for canceling offset noise of pixels in an image sensor, and to an image sensor operating according to the method.

BACKGROUND OF THE INVENTION

Figure 1:
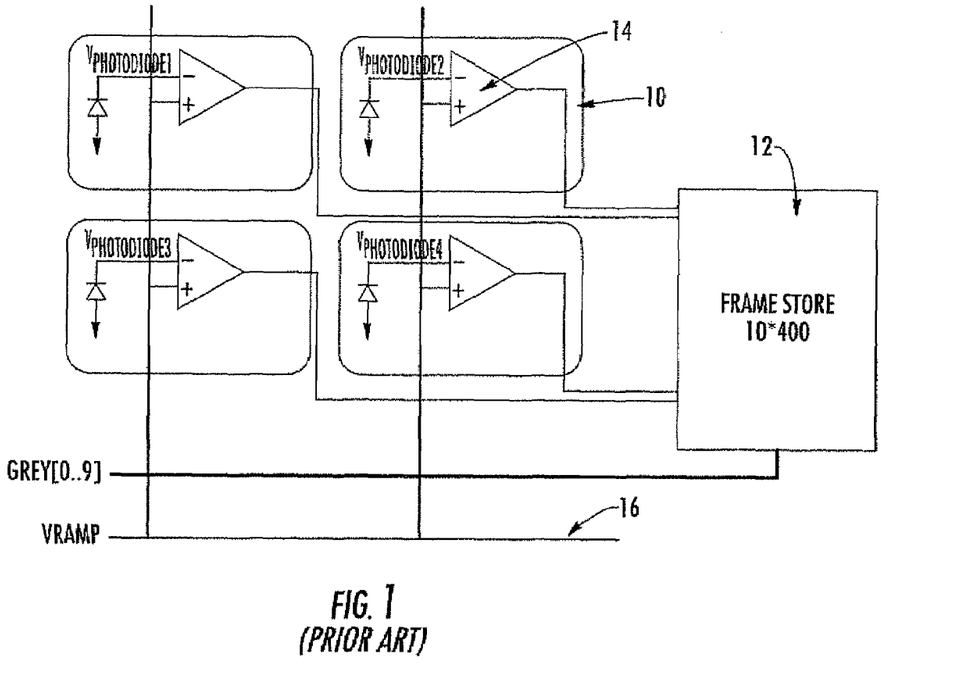
FIG. 1 is a block diagram of a digital pixel architecture according to the prior art.

FIG. 1 shows the typical architecture of a digital pixel sensor. There is an ADC in each pixel 10 and a memory 12 external to the image plane which stores the image data. The common architecture includes a comparator 14 inside each pixel 10. One input to the comparator 14 is the photodiode voltage, the other input is a reference line Vramp 16 common to all the pixels 10.

Figure 2:
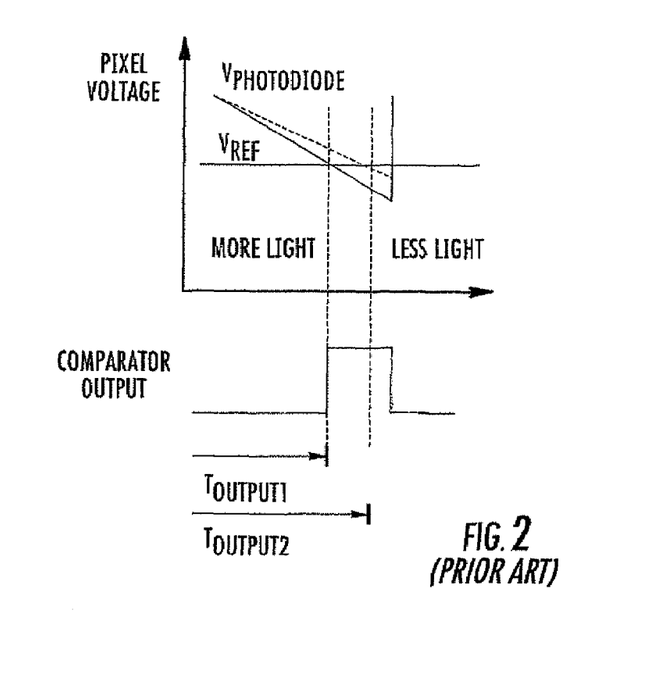
FIG. 2 is a plot of voltage versus time for an output of a comparator used in the architecture of FIG. 1.

The rate of change of the voltage on the photodiode is proportional to the amount of light impinging on the pixel. On a graph of voltage against time, an increase in incident light will result in a steeper slope. By measuring the time it takes for a given swing ($\Delta V$) on the pixel, the amount of light can be determined. This is illustrated in FIG. 2.

Figure 3:
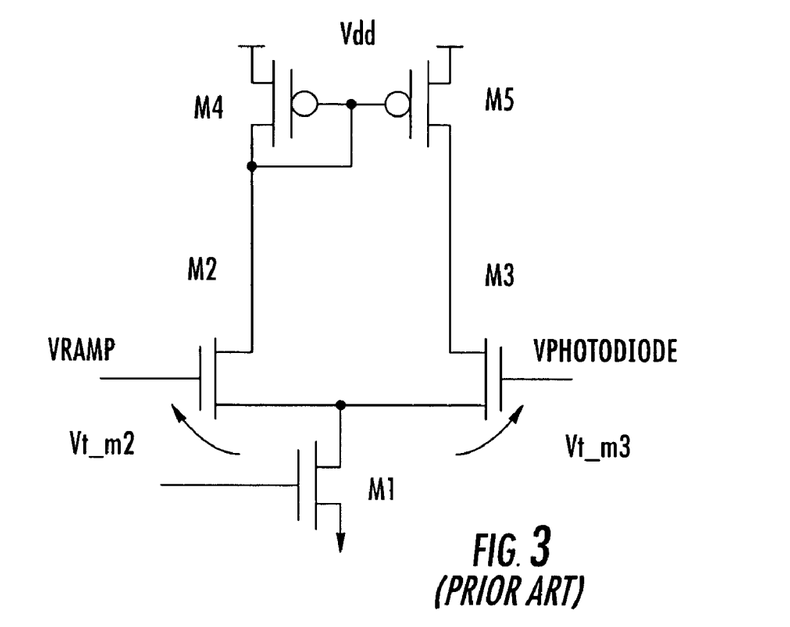
FIG. 3 is a schematic diagram of a typical comparator structure as used in FIGS. 1 and 2.

FIG. 3 shows a typical comparator structure. Ideally, the transistor M3 will be switched on when Vphotodiode=Vramp. However, due to manufacturing tolerances transistors do not have the same threshold voltage (Vt), i.e., Vt_m2≠Vt_m3. This can be re-written as Vt_m2=Vt_m3+$\delta V_{t3}$ or Vt_2-$\delta V_{t3}$=Vt_m3. There is a voltage offset Vos 18 (FIG. 4) required between the two inputs to make the output change states.

Figure 4:
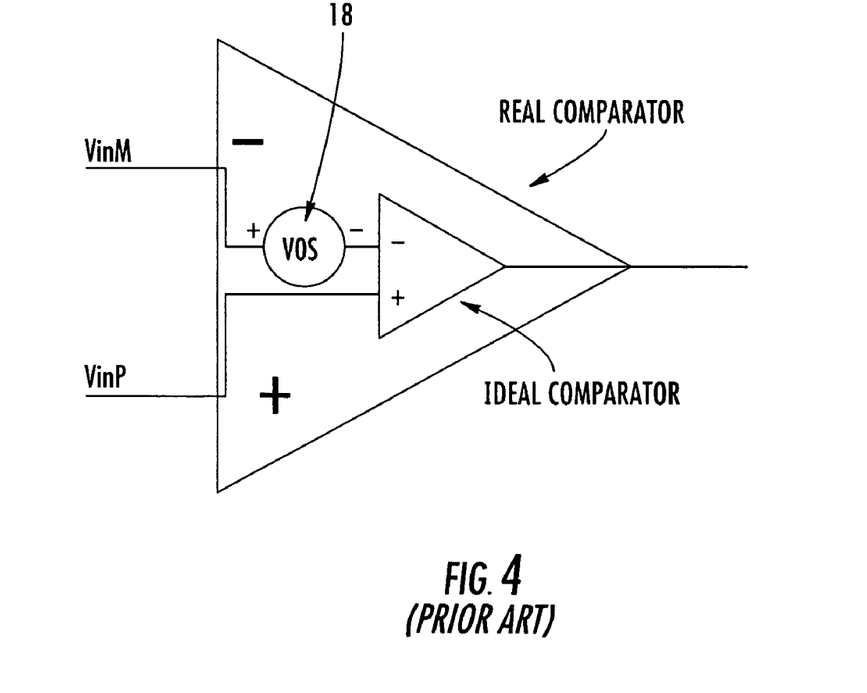
FIG. 4 is a schematic diagram of a comparator with an input offset voltage according to the prior art.

FIG. 4 illustrates the operation of a comparator 14. With an ideal comparator, the output changes when voltages applied at the comparator's inputs, VinM and VinP, are equal. Adding the input offset voltage 18 as shown in FIG. 4, the output will change when VinM−Vos=VinP. The Vos will be different from pixel to pixel, even on the same device.

With the digital pixel architecture of FIG. 1, this offset voltage causes a shift to the reference level, and an offset is added to the digital output. Take two pixels, with Vos1 and Vos2, and all the pixels have a common reference Vref connected to the comparators' VinP inputs. The VinM inputs are connected to the pixel photodiodes.

Pixel 1's comparator will change when VinM1−Vos1=VinP, similarly for pixel 2. Therefore, Vphotodiode1−Vos1=Vref, and Vphotodiode2−Vos2=Vref. This can be re-written, assuming Vref1=Vref+Vos1 and Vref2=Vref+Vos2. Pixel 1's comparator will therefore change when Vphotodiode1=Vref1, and pixel 2's comparator will therefore change when Vphotodiode2=Vref2.

Figure 5:
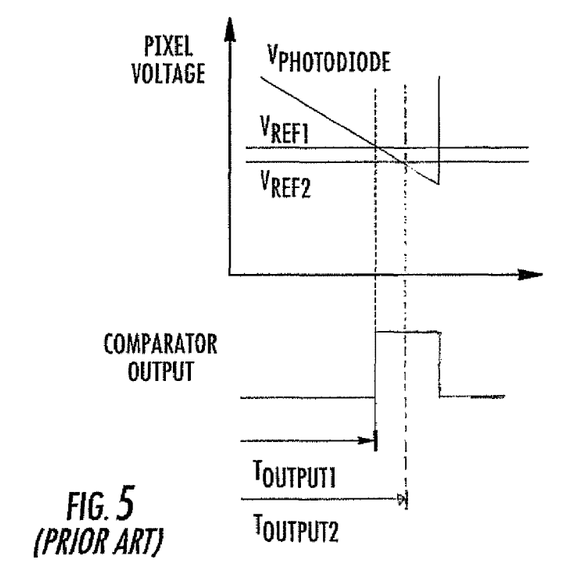
FIG. 5 is a plot of the voltage swing that results from the comparator with the offset of FIG. 4.

The input offset voltage appears to shift the reference level between pixels. This effect and its results can be seen in FIG. 5. This offset can detract from the quality of image obtained by the sensor, and therefore, methods have been sought to provide offset cancellation.

Known methods of analog cancellation require the storage of a reset voltage and the comparator offset on the photodiode of the pixel. This technique requires an increase in the actual voltage swing inside the pixel. To implement this, either the power supply needs to be increased or the operating range of the pixel is reduced.

More modern technologies have a lower operating voltage (e.g., 3.3V used to be common, 1.8V is now standard). The use of more modern technologies is needed to stay cost competitive, so the pixel needs to be re-designed to operate from lower voltages. Reducing the operating range is to be avoided since this increases the effect of noise sources, both internal (e.g., transistor thermal noise) and external (e.g., photon shot noise). There is a need to cancel the offset and also to account for fixed pattern noise (FPN), without either reducing the voltage swing on the pixel or increasing the voltage supply.

Digital cancellation can also be achieved by dark frame cancellation. This involves taking a dark reference frame and subtracting this from the image. In known digital cancellation techniques, the dark reference frame is taken with the same exposure (integration time) as the main image, but no light is impinged on the sensor. This may be achieved either using a shutter (mechanical or LCD) or by turning off the scene illumination.

On low performance systems, the black reference frame is acquired rarely. This leads to problems since the environment (especially the sensor's temperature) will change, such as causing differences in the offsets. A better technique is to acquire a dark reference frame shortly before image acquisition. The temperature of the sensor will then be similar for the dark reference frame and image frame, and the dark reference frame will be more accurate.

This technique is an effective method for removing dark current, since the integration time is the same, for both the image and dark reference frames. However, there are some disadvantages with dark frame cancellation. It requires acquiring 2 full frames for each output image. The acquired frame rate is therefore halved. As two images are subtracted, the random noise component is increased by $\sqrt{2}$. Reset noise (kTC noise) is not cancelled since it will be different for each frame.

For lower speed applications, dark current is a significant noise source and the above technique is very effective. For higher speed applications, dark current is much lower and of less concern and halving the frame-rate is often impractical.

Another cancellation technique is correlated double sampling (CDS). This involves taking a measurement immediately after reset and again at the end of exposure (i.e., readout). Subtracting the two values removes reset noise (kTC) and also offset. However, implementation of CDS at the pixel requires some extra space for the storage node, which reduces the amount of area in each pixel available for light collection (i.e., fill-factor), and the sensor's sensitivity is reduced.

SUMMARY OF THE INVENTION

In view of the foregoing background, an object of the present invention is to provide an offset cancellation method that does not incur a significant reduction in frame rate or loss of sensitivity in a pixel.

It would also be desirable for the method to be compatible with the cancellation of other sources of noise, for example kTC noise. It is also desirable to avoid storage of voltage at the pixel so that the fill factor and sensitivity of the sensor is not decreased.

In accordance with the present invention, a method for operating an image sensor is provided. The image sensor comprises an array of digital pixels and a memory connected to the array of digital pixels, with the memory comprising first and second frame stores. The method comprises obtaining reference data from the array of digital pixels, storing the reference data in the first frame store, obtaining image data from the array of digital pixels, and storing the image data in the second frame store. The reference data and image data are compared to obtain an image in which an offset of the array of pixels has been cancelled.

Another aspect of the present invention is to provide an image sensor comprising an array of digital pixels, a first frame store connected to the array of digital pixels for storing image data therefrom, and a second frame store connected to the array of digital pixels for storing reference data therefrom. A comparator connected to the first and second frame stores compares the reference data and the image data to obtain an image in which an offset of the array of pixels has been cancelled. The image sensor in accordance with the present invention may be integrated with a camera or optical mouse, for example.

BRIEF DESCRIPTION OF THE DRAWINGS

The present invention will now be described, by way of example only, with reference to the accompanying drawings, in which.

DETAILED DESCRIPTION OF THE PREFERRED EMBODIMENTS

Figure 7:
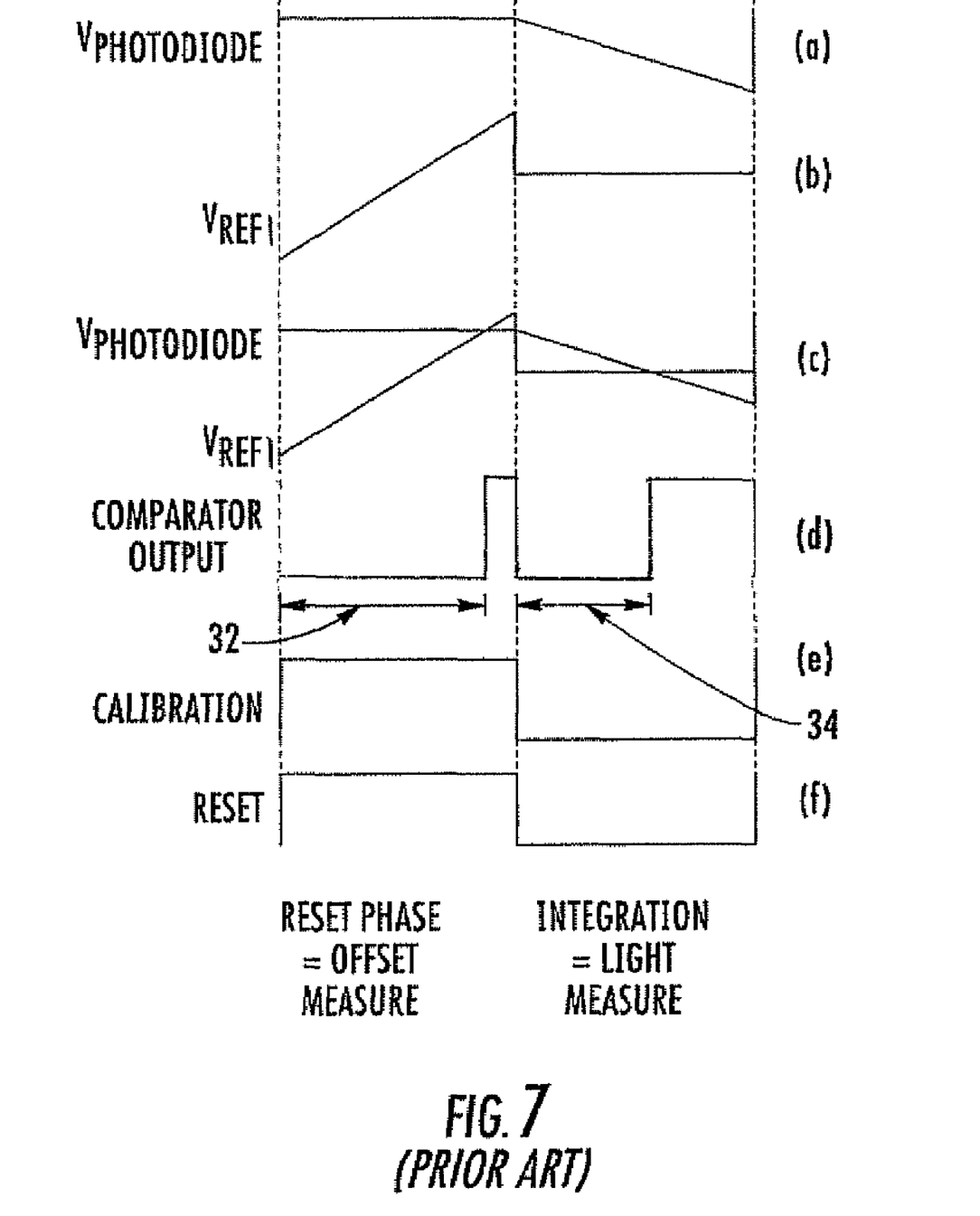
FIG. 7 is a timing diagram illustrating sensor readout according to a prior art digital cancellation technique.

FIG. 7 illustrates a prior art digital cancellation technique, which has a reset phase during which the offset is measured, and an integration phase during which the incident light is measured. During the reset phase, the calibration signal goes high, the illumination is removed (using shutter or turning off the light source), and the reference voltage starts to ramp from a low voltage level (corresponding to a maximum light exposure) to a high voltage level (corresponding to a minimum light exposure).

With no illumination on the pixel, the output from the photodiode remains constant (ignoring dark current and noise), and so the Vref signal should ramp to produce a crossing between Vref and Vphotodiode. The system measures this time which is directly proportional to the pixel's offset. This time can therefore be known as the offset time. The calibration signal is used to select which part of memory is used to store the data, i.e., dark offset data is used during this phase.

The reset signal is used to reset the voltage on the pixel's photodiode to a pre-determined voltage, e.g., Vrt. At the end of the reset phase, the RESET signal goes inactive and the reset switch in the pixel turns off. Due to the quantum nature of an electrical charge, there is an uncertainty as to the precise voltage on the pixel. This is called kTC noise or reset noise. The resent noise=$\sqrt{(kTC)/q}$, where k is Boltzmann's constant (1.3807E–23 JK$^{-1}$), T is the absolute temperature, C is the capacitance of the photodiode, and q is the charge on an electron (1.6E–19 Coloumbs).

The standard technique for removing reset noise is called correlated double sampling (CDS). The method described with reference to FIG. 7 is not suitable for performing CDS since the measurement of the offset is made during reset (i.e., the reset switch is closed and there is no uncertainty) rather than after reset (i.e., the reset switch has been opened and there is uncertainty). Furthermore, the measurement takes a long time and reduces frame-rate.

Figure 6:
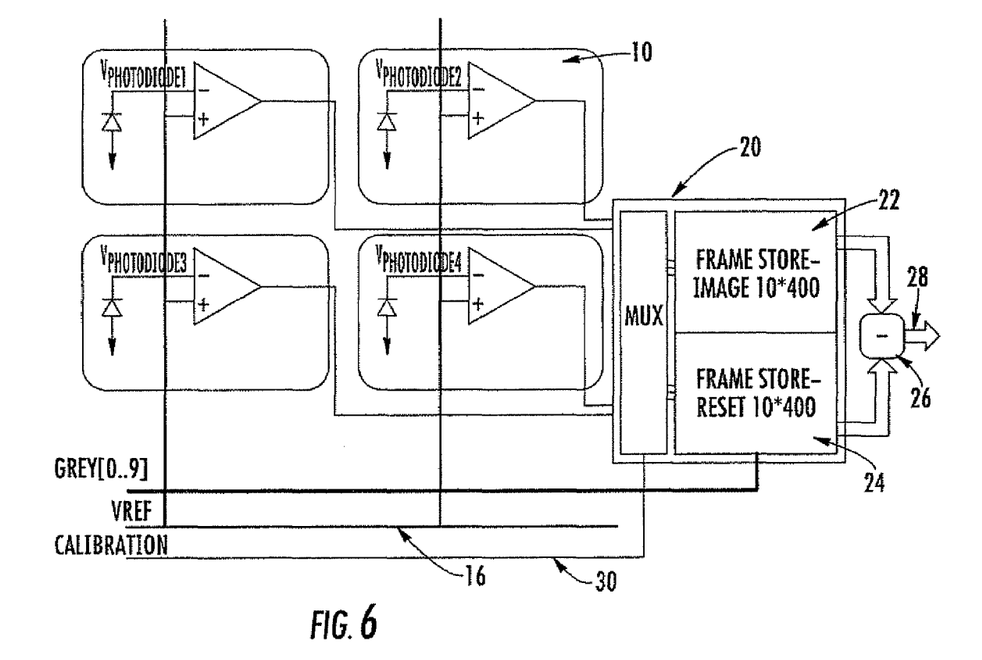
FIG. 6 is a block diagram of a digital pixel architecture in accordance with the present invention.

The invention provides for the digital calculation of the offset, as performed by a digital pixel having the architecture illustrated in FIG. 6. Data is stored in a frame store 20, which comprises a first frame store 22 for storing image data, and a second frame store 24 for storing reference data.

Reference data in general means any data that is additional to the pure image data. The reference data could be gathered together with or separately from the image data, and can comprise any data that is gathered for the purpose of increasing the quality of a final image. For example, the reference data can comprise a reading taken while the sensor is hidden from an image source that is used to determine the pixel's offset. The data stored in the first and second frame stores 22, 24 is then combined by combination means 26, which modifies the image data according to the reference data to produce a purified image signal 28.

Figure 8:
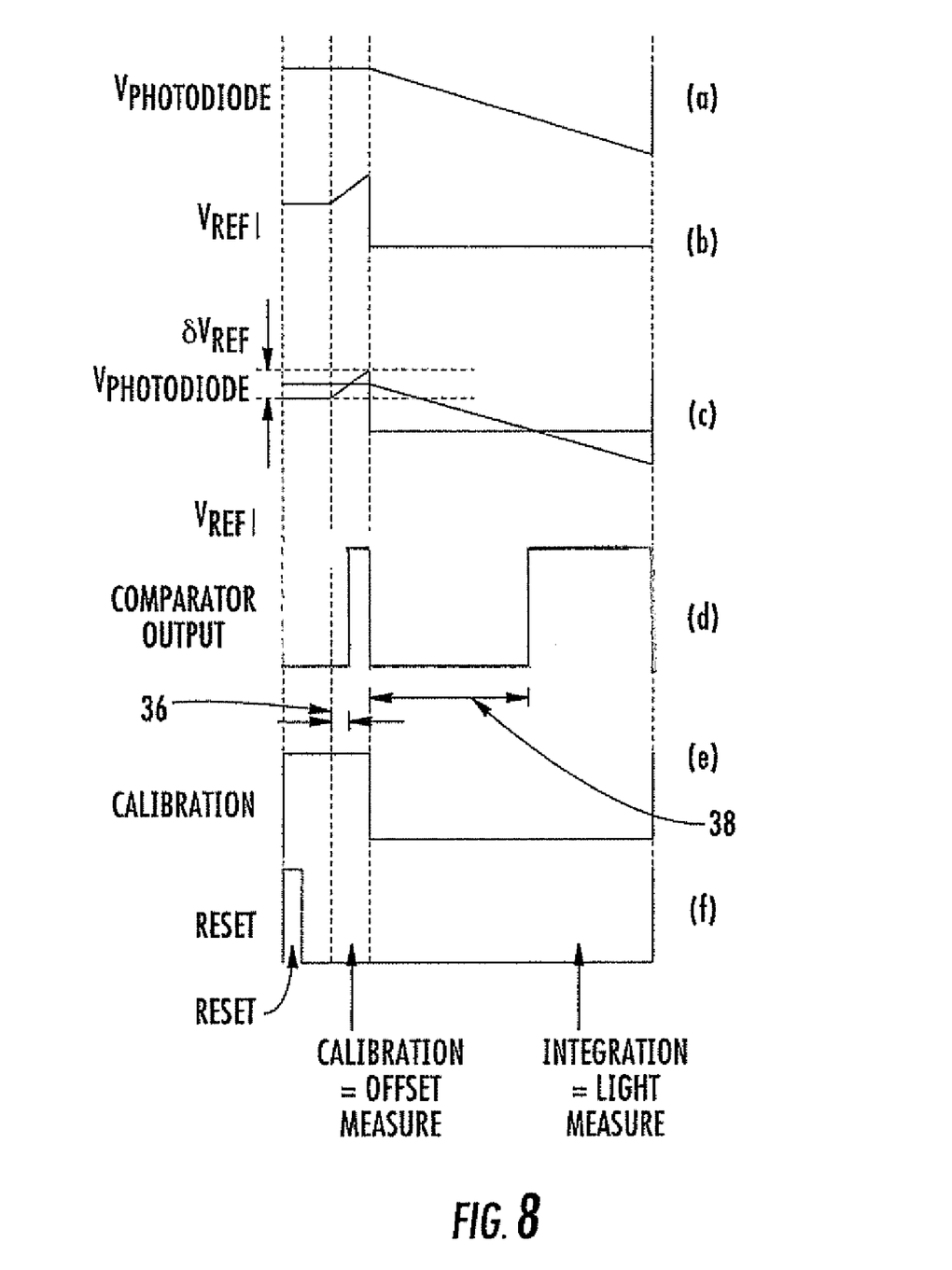
FIG. 8 is a timing diagram illustrating sensor readout according to a first embodiment of the present invention.

FIG. 8 illustrates a first embodiment of a method for operating an image sensor, in which there are three phases, namely a reset phase, a calibration phase (calibrate) and an integration phase, which comprises sensor exposure and conversion of the incoming signal.

Phase 1—Reset. During this phase the RESET line (f) goes active and the pixel is reset. Hence, the voltage at the photodiode (a) remains constant. The comparator is not used, so the value of the input Vref (b) is a do not care.

The time for reset is not critical to this application. The minimum time is determined by how quickly the support circuitry can reset the pixel. The maximum time is determined by the system's frame rate. Typically, the system will use the shortest reset period possible to maximize the frame rate. A practical range for the reset period is 1 µs to 10 µs. At the end of this period the RESET line (f) goes inactive and kTC noise is put onto the pixel.

Phase 2—Calibration. For high accuracy, there should be no illumination on the pixel during this phase. This can be achieved by either using a mechanical or LCD shutter. If there is light on the pixel, then Vphotodiode (a) will change during the calibration phase, degrading the accuracy of the offset compensation.

During this phase, the Vref signal (b) ramps. In the dark reference frame method as illustrated in FIG. 7, the Vref signal moved across the full voltage swing of the pixel. For this improved technique, the Vref signal moves by δVref which is much less than the full voltage swing.

To give some typical values, the full voltage swing of the pixel may be 1V, while the value of δVref may be 100 mV, giving a 1:10 ratio of δVref:V. This ratio can of course be of any suitable value depending on the particular sensor array and desired performance parameters. It has been found that a useful upper limit for the ratio is around 1:4.

This is of great advantage to the system. The reduced swing permits the calibration phase to be much shorter than the readout phase. The rate of change on Vref is constant, and is determined by the accuracy and/or speed of support circuitry. The system measures the voltage on the pixel by measuring the offset time 36 taken for the comparator to change states. This value is then stored.

Phase 3—Exposure. The pixel collects light causing the Vphotodiode line to discharge. The discharge rate is proportional to the illumination. The point at which the comparator output changes gives a time 38. This time 38 is known as the conversion time and is used as a measure of the light.

The actual amount of light falling on the pixel is then the difference between the readout value and calibration value. By subtracting the stored value (calibrate figure) from the readout value, the true illumination can be measured. This embodiment is suitable for use with a linear sensor, where the Vref signal is not used in the exposure phase.

Figure 9:
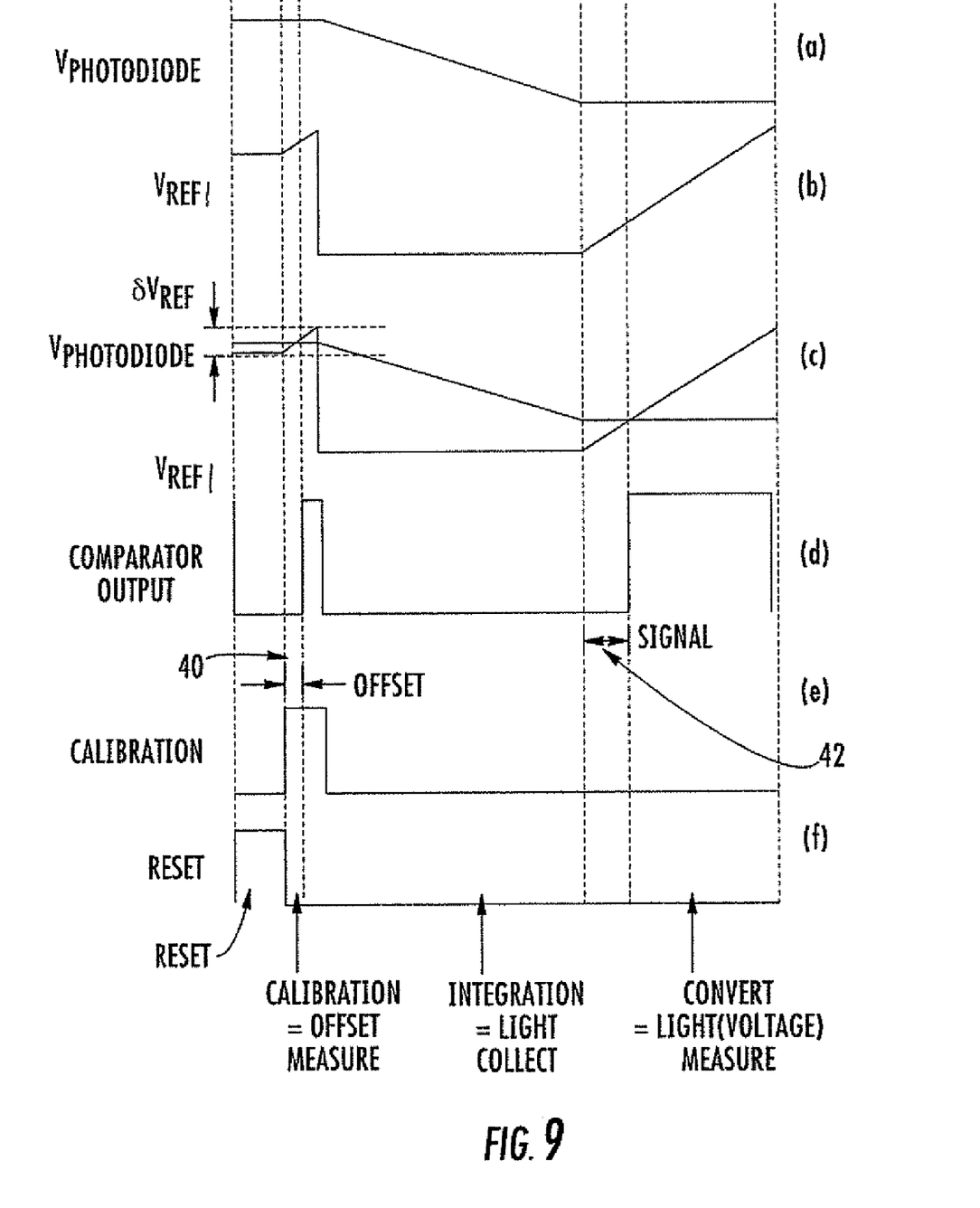
FIG. 9 is a timing diagram illustrating sensor readout according to a second embodiment of the present invention.

FIG. 9 illustrates a second embodiment of a method of operating an image sensor, which incorporates a reset phase, a calibration phase, an exposure phase and a conversion phase (convert).

The reset and calibration phases are similar to those of the first embodiment. However, the exposure and conversion phases are now treated independently rather than as a combined integration phase. This embodiment is suitable for use with an enhanced dynamic-range sensor.

Phase 3—Exposure. The Vref signal ramps during this phase. The point at which the comparator output changes is now inversely proportional to the light. This function is not linear and has the advantage that for a large amount of light 1/Light gets smaller, but can never reach zero. The pixel's readout can never saturate. Offset time 40 gives a measure of the pixel's offset.

Phase 4—Convert. After exposure, the illumination is turned off and the reference voltage then ramps between the black value and white value. Measuring the conversion time 42 for the comparator output to change gives a value for the illumination (including offset and kTC noise).

Improvements and modifications may be incorporated without departing from the scope of the invention. For example, the pixels could comprise an alternative light sensitive element, such as a phototransistor, rather than a photodiode. Also, while the figures illustrate a comparator being set to change when the reference voltage and the voltage applied to the photodiode are equal, the comparator could in fact be engineered to have a set offset. The offset changes when the values of the voltages concerned differ by an amount corresponding to that offset.

That which is claimed is:

1. A method for operating an image sensor comprising an array of digital pixels, and a memory connected to the array of digital pixels, the memory comprising first and second frame stores, the method comprising:
    applying a reference voltage to pixels of the array of digital pixels;
    obtaining reference data from the array of digital pixels by
        performing a reset phase for setting a voltage of a digital pixel to a value by applying a reset signal thereto, the reset signal being deasserted at an end of the reset phase,
        performing a calibration phase after the reset phase, the reference voltage being varied through the calibration phrase,
        measuring an offset time which is the time taken from a start of the calibration phase to when the reference voltage and a voltage provided at the digital pixel differs by a threshold amount greater than zero, and
        using the offset time as an indication of the pixel's offset;
    storing the reference data in the first frame store;
    obtaining image data from the array of digital pixels;
    storing the image data in the second frame store; and
    comparing the reference data and image data to obtain an image in which the offsets have been cancelled.

2. A method according to claim 1, wherein obtaining the image data comprises performing an exposure phase for collecting light.

3. A method according to claim 1, further comprising:
    measuring a conversion time which is the time from a start of the exposure phase to when the reference voltage and the voltage provided at the digital pixel differs by the threshold amount during the exposure phase; and
    using the conversion time as an indication of the illumination on the pixel.

4. A method according to claim 1, further comprising:
    performing a signal conversion phase subsequent to the exposure phase;
    varying the reference voltage throughout the signal conversion phase;
    measuring a conversion time which is the time from a start of the signal conversion phase to when the reference voltage and the voltage provided at the digital pixel differs by the threshold amount during the signal conversion phase; and
    using the conversion time as an indication of the illumination on the pixel.

5. A method according to claim 2, wherein the time taken to perform the calibration phase is less than the time taken to perform the exposure phase.

6. A method according to claim 1, wherein a total time taken to perform both the reset phase and the calibration phase is less than the time taken to perform the exposure phase.

7. A method according to claim 1, wherein the variation of the reference voltage in the calibration phase is not more than one quarter of the operating voltage range of the pixel.

8. A method according to claim 1, wherein exposure of the digital pixel to light is prevented throughout the calibration phase.

9. A method according to claim 4, wherein exposure of the digital pixel to light is prevented throughout the signal conversion phase.

10. A method according to claim 2, further comprising:
    measuring the voltage of the digital pixel at an end of the reset phase; and
    measuring the voltage of the digital pixel at the end of an exposure phase; and
    comparing these measurements to determine information about a reset noise of the pixel.

11. A method according to claim 1, wherein the digital pixel comprises a photodiode.

12. An image sensor comprising;
    an array of digital pixels;
    a first frame store for storing image data from said array of digital pixels;
    a second frame store for storing reference data from said array of digital pixels;
    a reset device for performing a reset phase by setting a voltage of the digital pixels to a value by applying a reset signal thereto, the reset signal being deasserted at an end of the reset phase;
    a voltage source for applying a variable reference voltage to the digital pixels after the reset phase;
    a shutter for selectively exposing the digital pixels to light;
    a circuit coupled to said first and second frame stores for comparing the reference data and the image data to obtain an image in which an offset of said array of pixels has been cancelled,
    a comparator to change states when the voltage of a digital pixel and the reference voltage applied to the digital pixel differs by a threshold amount greater than zero.

13. An image sensor according to claim 12, further comprising a frame store selection device connected to said first and second frame stores.

14. An image sensor according to claim 12, further comprising a time measurement device for performing a calibration phase during which the reference voltage is varied, and for recording an off-set time corresponding to the time taken from a start of the calibration phase to when said comparator changes state.

15. An image sensor according to claim 12, where said time measurement device records a conversion time from a start of an exposure phase until a time when said comparator makes a further change of state during the exposure phase.

16. An image sensor according to claim 15, wherein the time taken to perform the calibration phase is less than the time taken to perform the exposure phase.

17. An image sensor according to claim 12, wherein variation of the reference voltage in the calibration phase is not more than one quarter of an operating voltage range of the pixel.

18. An image sensor according to claim 12, wherein the digital pixel comprises a photodiode.

19. An image sensor according to claim 12, wherein the image sensor is integrated with a camera.

20. An image sensor according to claim 12, wherein the image sensor is integrated with an optical mouse.

* * * * *